(12) United States Patent
Crombez et al.

(10) Patent No.: US 6,480,106 B1
(45) Date of Patent: Nov. 12, 2002

(54) RATE OF CONSUMPTION GAUGE WITH VARIABLE RATE OF CONSUMPTION LIMITS

(75) Inventors: Dale Scott Crombez, Livonia, MI (US); Steven Lee Napier, Canton, MI (US); Christopher A. Ochocinski, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 124 days.

(21) Appl. No.: 09/681,658

(22) Filed: May 17, 2001

Related U.S. Application Data

(60) Provisional application No. 60/254,423, filed on Dec. 11, 2000.

(51) Int. Cl.[7] .................................................. B60Q 1/00
(52) U.S. Cl. ........................ 340/461; 340/438; 340/441; 340/455; 340/636; 320/48
(58) Field of Search ................... 340/438, 439, 340/441, 455, 461, 462, 815.45, 815.69, 636; 320/48

(56) References Cited

U.S. PATENT DOCUMENTS

| | | | | |
|---|---|---|---|---|
| 5,309,139 A | * | 5/1994 | Austin | ........................ 340/462 |
| 5,343,970 A | | 9/1994 | Severinsky | |
| 5,422,625 A | * | 6/1995 | Skaemura | .................... 340/461 |
| 5,532,671 A | | 7/1996 | Bachman et al. | |
| D378,500 S | | 3/1997 | Nakai et al. | |
| 5,757,595 A | * | 5/1998 | Ozawa et al. | ................ 340/455 |
| 5,764,139 A | * | 6/1998 | Nojima et al. | ............... 340/461 |
| 5,920,256 A | * | 7/1999 | Toffolo et al. | .............. 340/461 |
| 5,949,330 A | * | 9/1999 | Hoffman et al. | ............ 340/438 |
| 6,140,917 A | * | 10/2000 | Branson | ..................... 340/461 |
| 6,175,303 B1 | | 1/2001 | Theofanopoulos et al. | |

* cited by examiner

Primary Examiner—Daniel J. Wu
(74) Attorney, Agent, or Firm—Carlos L. Hanze

(57) ABSTRACT

The invention is an improved method and system to monitor vehicle operation state and operator requests. It combines into a single gauge information indicating current vehicle operating state and ability to increase power assist using a display of instantaneous rate of consumption usage superimposed over available rate of power consumption limits. The invention can display whether an operator is requesting power assist, regenerative braking or battery charging while also displaying the available amount of each under present operating conditions. A vehicle system controller (VSC) or similar type controller is connected to the gauge, which can limit instantaneous rate of consumption usage or charge to the available rate of power consumption or charge limits. The invention can use analog needles or LEDs in various configurations as well as adding warning lamps or chimes when the instantaneous rate of consumption usage approaches or exceeds the available rate of power consumption limits.

23 Claims, 2 Drawing Sheets

RATE OF CONSUMPTION GAUGE WITH VARIABLE RATE OF CONSUMPTION LIMITS

CROSS REFERENCE TO RELATED APPLICATIONS

This application claims priority to a provisional patent application Ser. No. 60/254,423 titled, "Rate of Consumption Gauge with Variable Rate of Consumption Limits," filed Dec. 11, 2000. The entire disclosure of ser. No. 60/254,423 is incorporated herein by reference in its entirety.

BACKGROUND OF INVENTION

The present invention relates generally to a vehicle monitoring system and method, and more particularly to a combined system and method to monitor and communicate the instantaneous rate of consumption usage, along with the limits of the available rate of consumption, both positive and negative.

The need to reduce fossil fuel consumption and emissions in automobiles and other vehicles predominately powered by internal combustion engines (ICEs) is well known. Vehicles powered by electric motors or other power sources attempt to address these needs. Other alternative solutions combine a smaller ICE with electric motors or other power sources into one vehicle. Vehicles that combine the advantages of an ICE vehicle and an electric vehicle are typically called Hybrid Electric Vehicles (HEVs). See generally, U.S. Pat. No. 5,343,970 to Severinsky.

The desirability of combining an ICE with other power sources such as an electric motor is clear. There is great potential for reducing vehicle fuel consumption and emissions with no appreciable loss of vehicle performance or drive-ability. An HEV not only allows the use of smaller ICEs, but also allows regenerative braking, electric power assist in the vehicle's powertrain, and even powering the vehicle without assistance from the ICE.

New ways must be developed to operate these dual powered vehicles. In conventional ICE vehicles, several familiar gauges provide vehicle state information such as vehicle speed, engine temperature, engine RPMs, and alternator function. The HEV and other more sophisticated and complex vehicles must convey new types of vehicle state information to the operator. These monitoring systems must be simple and easy to read.

For example, operators must be notified of HEV state information on available power assist limits by stored power sources such as batteries because the operator must known when powertrain requests cannot be met under present vehicle operating conditions. More specifically, in an electric or partial electric (hybrid) vehicle, the available power to accelerate the vehicle may become inconsistent due to many factors. For example, when the battery is at a low state of charge or excessively warm, the battery power available to a vehicle's electric motors may be temporary limited. The operator must be aware of these conditions and know when the battery power is limited so that a maneuver that may require battery power to the electric motor is not attempted.

Battery energy displays, gauges, or monitors for electric vehicles are known in the prior art. U.S. Pat. No. 6,175,303 B1 to Theofanopoulos et al. describes a battery energy-measuring device indicating maximum available battery current on an analogue scale as a percentage. U.S. Pat. No. 5,532,671 Bachman et al. signals to an operator of an electric vehicle that the battery is at a reduced state of charge by requiring the accelerator to be depressed farther to provide an equivalent accelerator command to the controller that controls the motor. U.S. Pat. No. Des. 378,500 to Nakai et al. describes an ornamental design for residual battery capacity and electric vehicle range.

It is also common in an electric or partial electric vehicle to include an analog gauge that displays whether the operator is requesting power assist, regenerative braking or battery charging. Unfortunately, the known indicators for electric and HEV vehicles are often complicated and confusing to an operator and clutter the vehicle dashboard.

SUMMARY OF THE INVENTION

Accordingly, the present invention provides an improved method and system to monitor vehicle operation state and operator requests.

The main object of the present invention is to combine into a single, easy to read gauge information indicating the current vehicle operating state and the ability to increase power assist.

It is a further object of the present invention to provide a single gauge that combines the available rate of power consumption limits and instantaneous rate of consumption usage.

It is a further object of the present invention to provide a vehicle gauge that displays whether an operator is requesting power assist, regenerative braking or battery charging while also displaying the amount of power assist, regenerative braking or battery charging that is possible for the vehicle under present operating conditions.

The instantaneous rate of consumption usage or charge can be limited to the available rate of power consumption or charge limits by a vehicle system controller (VSC) or similar type controller. The invention can use analog needles or light emitting diodes in various configurations as well as adding warning indicator lamps or chimes when the instantaneous rate of consumption usage approaches or exceeds the available rate of power consumption limits.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and FIGS. below, in which like numerals represent like elements and in which.

DETAILED DESCRIPTION

The present invention combines various vehicle state information into one simple and easy to understand monitor.

The disclosed monitors convey the available rate of consumption limits and instantaneous rate of consumption usage from several types of power sources such as battery powered systems, partially battery powered systems, fuel cell systems, pneumatic powered systems, and hydraulic powered systems under the control of a vehicle system controller (VSC) or similar type controller known in the prior art.

Figure 1:
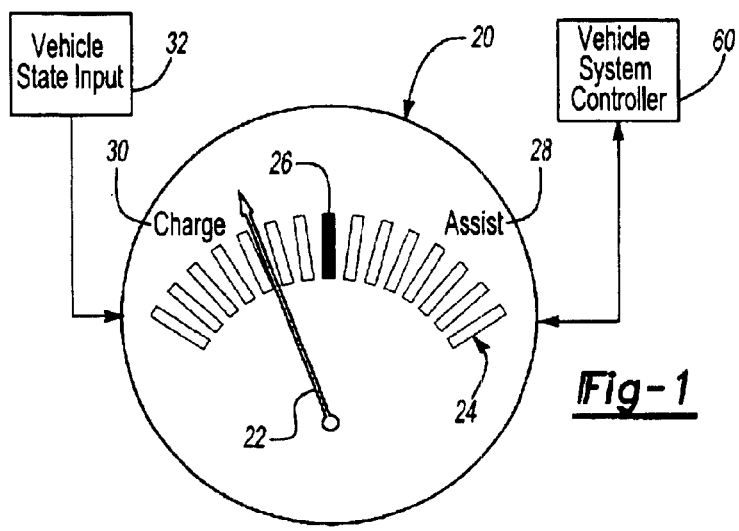
FIG. 1 illustrates a gauge embodying the present invention under normal operating conditions.

The preferred embodiment is illustrated in FIGS. 1 through 4. Here, a monitor/gauge/display superimposes instantaneous rate of consumption usage over a gauge that communicates limits of the available rate of consumption. As illustrated in FIG. 1, a gauge 20 can receive vehicle state input 32 such as driver requests for power, regenerative braking, battery state of charge, battery temperature (battery not shown). The gauge 20 can also output information (such as the displayed instantaneous rate of consumption usage and limits of the available rate of consumption) to a vehicle system controller (VSC) 60. The VSC 60 can, by way of example, limit the gauge's 20 instantaneous rate of energy consumption to the available rate of energy consumption. In FIG. 1, the gauge 20 has an analog device such as a needle 22 to indicate (show/display) instantaneous rate of consumption usage. This instantaneous usage rate may be based on driver request for assist or charge (such as regenerative braking). The needle 22 is superimposed over a bank of light emitting diodes (LEDs) 24 that indicate the limits of the available rate of consumption (both positive and negative rates of consumption). The LEDs 24 have a center point 26, a variable positive rate of consumption limit to one side (assist) 28, and a variable negative rate of consumption limit (charge) 30 to the other side. Assist 28 occurs, for example, when a vehicle's battery usage is needed to provide power to an electric drive that, in turn, provides torque or power to a vehicle powertrain. Negative rate of consumption, or charge 30, occurs when, for example, the battery is being charged by a vehicle generator or regenerative braking. Regenerative braking captures kinetic energy of a vehicle that is usually lost as heat in the vehicle's brakes when an operator requests slowing or stopping the vehicle.

Figure 2:
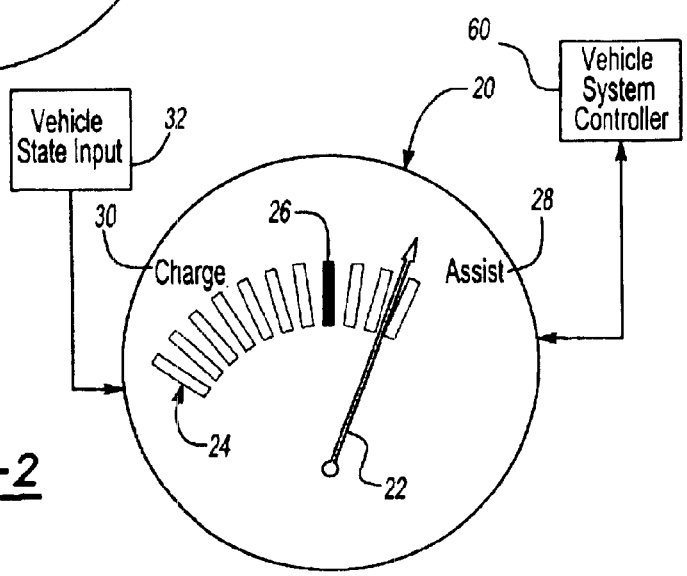
FIG. 2 illustrates the gauge of FIG. 1 under partially limited assist conditions.
Figure 3:
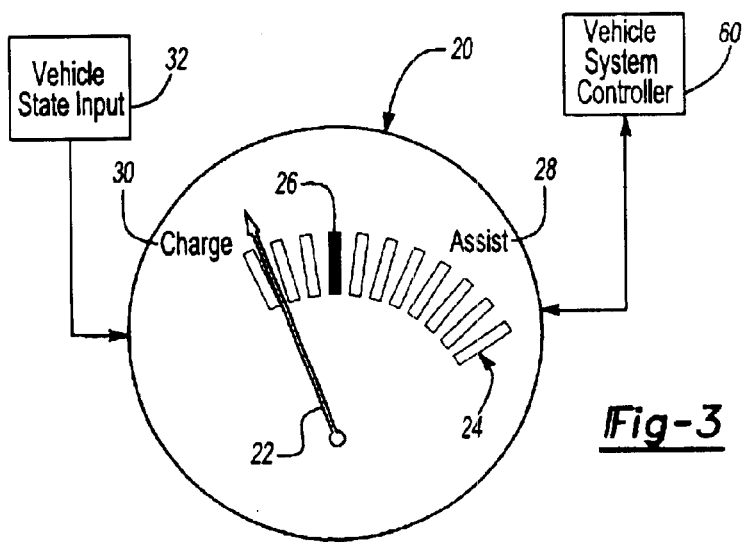
FIG. 3 illustrates the gauge of FIG. 1 under partially limited charge conditions.

The needle 22 while positioned on the assist 28 side of the LED 24 bank, as illustrated in FIG. 2, indicates the instantaneous rate of consumption of a stored resource such as the battery or fuel cell system (see below) in a positive direction. The more the assist is available, the more LEDs 24 will be indicated on the assist 28 side of the LED 24 bank. The needle 22, while positioned on the charge 30 side of the LED 24 bank, as illustrated in FIG. 3, also indicates the instantaneous rate of consumption of the stored resource, such as the battery, in a negative direction. Put another way, the stored resource is replenished to enable assist in the future. The more the stored resource is able to replenish, the more LEDs 24 will be indicated on the charge 30 side of the LED 24 bank.

By displaying both instantaneous and available rate of consumption, FIG. 2 illustrates how the gauge 20 indicates available assist 28. If a limitation exists in the available assist 28 (such as the VSC 60 limiting discharge during a low battery state of charge), the LEDs 24 on the assist 28 side of the gauge 20 would progressively turn off until the gauge 20 indicates that no assist 28 is available. The needle 22 can only move toward the assist 28 side of the gauge 20 to the point where the LEDs 24 are lit as determined by the VSC 60. Thus, the gauge 20 indicates to the operator how much assist 28 is available and how much assist 28 is being used relative to the available assist 28. The gauge 20 would also indicate when no assist 28 is available.

Likewise, if the available charge capability is limited (such as during a high battery state of charge), the LEDs 24 on the charge 30 side of the gauge 20 would progressively turn off until the gauge 20 indicates that little or no charge is available as illustrated in FIG. 3. The needle 22 can only move toward the charge 30 side of the gauge 20 to the point where the LEDs 24 are lit, representing the charge 30 limit of the vehicle. The gauge 20 thus informs the operator how much charge 30 is being performed relative to an available charging capability. The gauge 20 would also tell the operator when no charge 30 capability is available.

Figure 4:
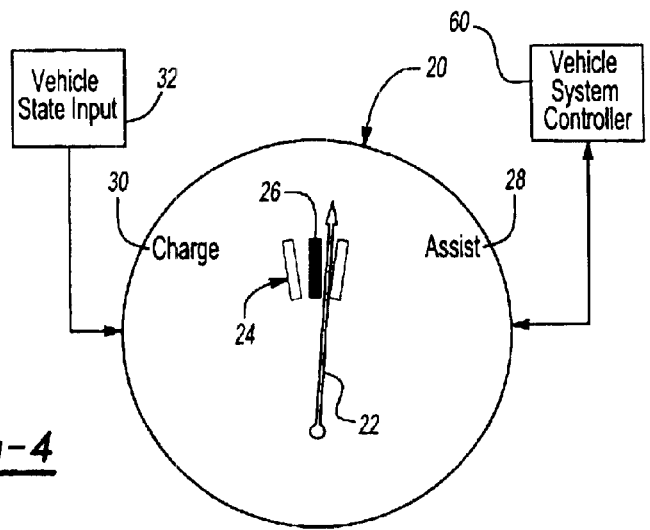
FIG. 4 illustrates the gauge of FIG. 1 under partially limited charge and assist conditions.

Under certain conditions, both charge 30 capability and assist 28 capability may be limited as illustrated in FIG. 4. By way of example, limited discharge and limited recharge may exist when the battery temperature is too high or too low. During these conditions, the LEDs 24 of both the charge 30 side and the assist 28 side of the gauge 20 would progressively turn off and thus the needle 22 gauge's range of movement would be limited to the center point 26 of the gauge 20 where the LEDs 24 are lit.

Other variations of the preferred embodiment are possible. For example, the gauge 20 could add additional indicators (such as an indicator lamp or chime, not shown) to warn the operator that there is no or virtually no assist or charge available. Further, the LED 24 bank may use various colors to indicate different levels of assist and charge instead of turning the LEDs 24 off.

Figure 5:
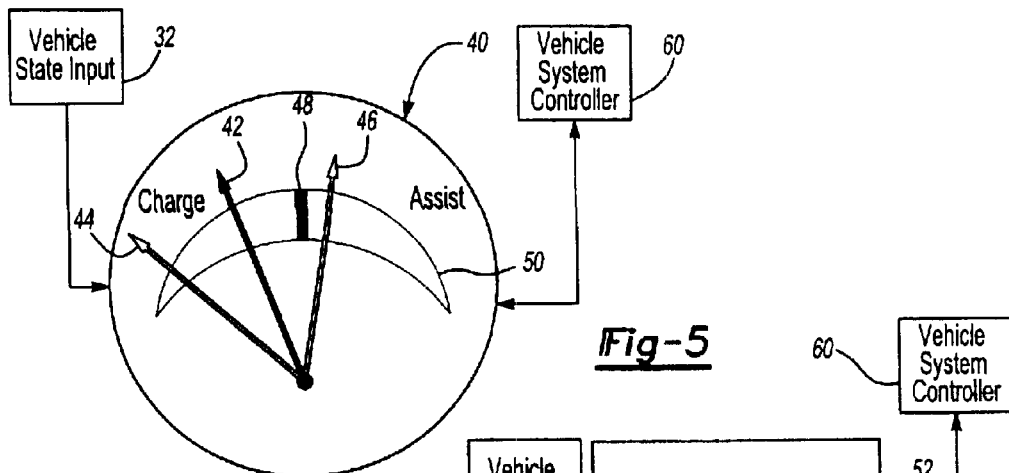
FIG. 5 illustrates a second gauge embodying the present invention and using three needles to demonstrate a partially limited charge and highly limited assist condition.

FIG. 5 illustrates a first alternate gauge 40 with three analog needles and no LEDs. First alternate gauge 40 has a first alternate gauge needle 42 to indicate instantaneous rate of consumption usage. The first alternate gauge needle 42 is superimposed over a first alternate gauge charge needle 44 and a first alternate gauge assist needle 46 that indicate the range limits of the available rate of consumption (both positive and negative rates of consumption as in the preferred embodiment). First alternate gauge charge needle 44 would indicate the charge level available (limit), and first alternate gauge assist needle 46 would indicate the assist level available (limit). First alternate gauge needle 42 moves between the needle 44 and needle 46 as determined by the VSC 60. A first alternate gauge center point 48 is also included to indicate no instantaneous rate of consumption for first alternate gauge needle 42, no charge ability for first alternate gauge charge needle 44, and no assist ability for first alternate gauge assist needle 46. A bar 50 indicates the extreme limits of assist, charge, and consumption. The needle positions in FIG. 5 show a slight instantaneous charge with partially limited charge and mostly limited assist conditions.

Figure 6:
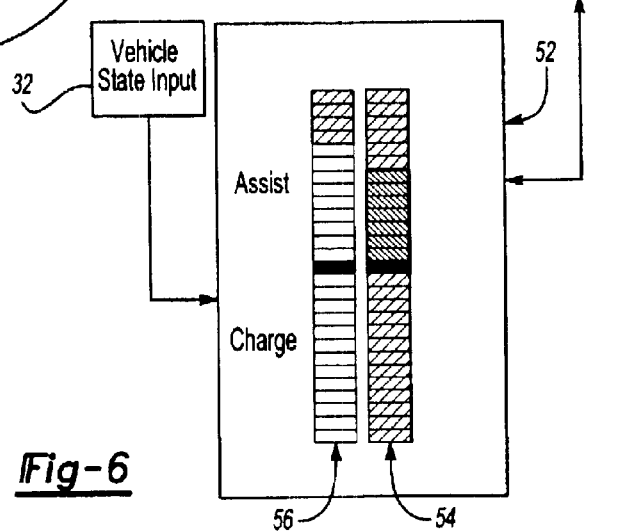
FIG. 6 illustrates a third gauge embodying the present invention and using only LED's or the like to demonstrate a partially limited assist condition.

Yet another embodiment of the present invention is illustrated in FIG. 6. This second alternate gauge 52 is in the form of a dual LED bar gauge. The second alternate gauge 52 uses a second alternate gauge first LED bank 54 to act in similar fashion as needle 22 (illustrated in FIGS. 1 through 4) between the available charge/assist and the instantaneous charge/assist. This embodiment's second alternate gauge second LED bank 56 acts in similar fashion as LEDs 24 (illustrated in FIGS. 1 through 4).

The following examples demonstrate how the present invention can be utilized in a variety of vehicle powertrain configurations using a variety of vehicle state sensors and under the vehicle system control (VSC) 60:

1. Battery Powered Systems:
   Instantaneous Rate of Consumption=battery power
   Available Rate of Consumption Limits=maximum recharge power limit, maximum discharge power limit as determined or applied by the VSC.

Instantaneous Rate of Consumption=battery current

Available Rate of Consumption Limits=maximum recharge current limit, maximum discharge current limit as determined or applied by the VSC.

Instantaneous Rate of Consumption=battery voltage

Available Rate of Consumption Limits=maximum recharge voltage limit, maximum discharge voltage limit as determined or applied by the VSC.

Fuel Cell Powered Systems:

Instantaneous Rate of Consumption=fuel cell power

Available Rate of Consumption Limits=(0) maximum recharge power limit or minimum desired discharge power limit, maximum discharge power limit as determined or applied by the VSC.

3. Any Shared Power Systems: (Preferred Embodiment)

Instantaneous Rate of Consumption=component/subsystem power

Available Rate of Consumption Limits=maximum budgeted recharge power limit, maximum budgeted discharge power limit as determined or applied by the VSC.

4. Pneumatic Powered Systems:

Instantaneous Rate of Consumption=gas flow rate and pressure (power)

Available Rate of Consumption Limits=maximum recharge gas flow rate and pressure (power) limit, maximum discharge gas flow rate and pressure (power) limit as determined or applied by the VSC.

Instantaneous Rate of Consumption=pressure

Available Rate of Consumption Limits=maximum recharge gas pressure limit, maximum discharge gas pressure limit as determined or applied by the VSC.

5. Hydraulic Powered Systems: Instantaneous Rate of Consumption=fluid flow rate and pressure (power)

Available Rate of Consumption Limits=maximum recharge fluid flow rate and pressure (power) limit, maximum discharge fluid flow rate and pressure (power) limit as determined or applied by the VSC.

Instantaneous Rate of Consumption=pressure

Available Rate of Consumption Limits=maximum recharge fluid pressure limit, maximum discharge fluid pressure limit as determined or applied by the VSC.

The above-described embodiments of the present invention are provided purely for purposes of example. Many other variations, modifications, and applications of the invention may be made.

We claim:

1. A display for a vehicle comprising:

a first gauge element indicating instantaneous rate of energy consumption; and a second gauge element indicating available rate of energy consumption;

wherein said first gauge element is superimposed over said second gauge element.

2. The display of claim 1 further comprising:

a vehicle system controller (VSC);

a set of vehicle state inputs connected to the first gauge element and second gauge element; and an output from the display to the VSC, wherein the VSC limits the instantaneous rate of energy consumption to the available rate of energy consumption.

3. The display of claim 1 wherein said second gauge element indicating available rate of energy consumption comprises a charge side and an assist side.

4. The display of claim 1 wherein:

said first gauge element indicating instantaneous rate of energy consumption comprises an analog needle; and said second gauge element indicating the available rate of energy consumption comprises light emitting diodes (LEDs).

5. The display of claim 1 wherein:

said first gauge element indicating the instantaneous rate of energy consumption comprises LEDs; and said second gauge element indicating the available rate of energy consumption comprises LEDs.

6. The display of claim 1 wherein:

said first gauge element indicating the instantaneous rate of energy consumption comprises an analog needle; and said second gauge element indicating the available rate of energy consumption comprises analog needles.

7. The display of claim 1 further comprising a warning when a desired first gauge element indicating the instantaneous rate of energy consumption approaches said second gauge element indicating the available rate of energy consumption.

8. The display of claim 1 further comprising a warning when a desired first gauge element indicating the instantaneous rate of energy consumption exceeds said second gauge element indicating the available rate of energy consumption.

9. The display of claim 7 wherein the warning comprises an indicator lamp on the display.

10. The display of claim 8 wherein the warning comprises an indicator lamp on the display.

11. The display of claim 7 wherein the warning comprises a chime.

12. The display of claim 8 wherein the warning comprises a chime.

13. A method of displaying vehicle energy status comprising the steps of:

monitoring instantaneous rate of energy consumption;

monitoring available rate of energy consumption; and superimposing a first gauge element indicating the instantaneous rate of energy consumption over a second gauge element indicating the available rate of energy consumption.

14. The method of claim 13 wherein the step of monitoring available rate of energy consumption comprises steps of monitoring charge and monitoring assist.

15. The method of claim 13 wherein indicating is achieved using light emitting diodes.

16. The method of claim 13 wherein indicating is achieved using an analog needle.

17. The method of claim 13 wherein indicating is achieved using a combination of analog needles and LEDS.

18. The method of claim 13 further comprising the step of warning an operator when a desired instantaneous rate of energy consumption approaches the available rate of energy consumption.

19. The method of claim 13 further comprising the step of warning an operator when a desired instantaneous rate of energy consumption exceeds the available rate of energy consumption.

20. The method of claim 18 wherein the step of warning is achieved using an indicator lamp.

21. The method of claim 18 wherein the step of warning is achieved using a chime.

22. The method of claim 19 wherein the step of warning is achieved using an indicator lamp.

23. The method of claim 19 wherein the step of warning is achieved using a chime.

* * * * *